(12) United States Patent
Hashimoto et al.

(10) Patent No.: US 9,712,536 B2
(45) Date of Patent: Jul. 18, 2017

(54) ACCESS CONTROL DEVICE, ACCESS CONTROL METHOD, AND PROGRAM

(71) Applicant: NOMURA RESEARCH INSTITUTE, LTD., Chiyoda-ku, Tokyo (JP)

(72) Inventors: Jun Hashimoto, Tokyo (JP); Ryoichi Teramura, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 14/760,045

(22) PCT Filed: Jan. 9, 2013

(86) PCT No.: PCT/JP2013/050235
§ 371 (c)(1),
(2) Date: Jul. 9, 2015

(87) PCT Pub. No.: WO2014/109022
PCT Pub. Date: Jul. 17, 2014

(65) Prior Publication Data
US 2015/0350222 A1    Dec. 3, 2015

(51) Int. Cl.
*H04L 29/06* (2006.01)
*G06F 21/62* (2013.01)

(52) U.S. Cl.
CPC ............ *H04L 63/102* (2013.01); *G06F 21/62* (2013.01); *H04L 63/08* (2013.01); *H04L 63/101* (2013.01); *H04L 63/105* (2013.01)

(58) Field of Classification Search
CPC ........ H04L 63/102; H04L 63/08; H04L 29/06
(Continued)

(56) References Cited

U.S. PATENT DOCUMENTS 7,703,033 B2    4/2010  Buchholz
2006/0101019 A1*  5/2006  Nelson ................ G06F 21/6218
(Continued)

FOREIGN PATENT DOCUMENTS

JP    2006053824 A    2/2006
JP    2008117316 A    5/2008
(Continued)

OTHER PUBLICATIONS

Japanese Notice of Reasons for Rejection corresponding to Application No. 2014-556257; Mailing Date: May 17, 2016, with English abstract.
(Continued)

*Primary Examiner* — Jeffrey Pwu
*Assistant Examiner* — Samuel Ambaye
(74) *Attorney, Agent, or Firm* — Cantor Colburn LLP

(57) ABSTRACT

An embodiment of the present invention is provided with an access control device, an access control method, and a program that are capable of easily managing access control and easily confirming whether appropriate access control is exercised. An access control device has a screen generation unit for generating selection screen information allowing for an access rule used by a user having logged in to a working terminal to be selected from one or a plurality of access rules created by an administrator of a client environment, and an access control unit for executing access control on a user according to an access rule selected from access rules displayed on the basis of the selection screen information.

6 Claims, 17 Drawing Sheets

(58) Field of Classification Search
USPC .............................................................. 726/3
See application file for complete search history.

(56) References Cited

U.S. PATENT DOCUMENTS

2006/0277593 A1* 12/2006 Buchholz ............ G06F 21/6218
726/2
2008/0060080 A1* 3/2008 Lim ........................ G06F 21/62
726/26

FOREIGN PATENT DOCUMENTS

| | | | |
|---|---|---|---|
| JP | 2008117317 | A | 5/2008 |
| JP | 2008226057 | A | 9/2008 |
| JP | 2008226058 | A | 9/2008 |
| JP | 2009258820 | A | 11/2009 |
| JP | 2009258826 | A | 11/2009 |
| JP | 2012203624 | A | 10/2012 |
| JP | 2013161123 | A | 8/2013 |

OTHER PUBLICATIONS

Singapore Written Opinion corresponding to Patent Application No. 11201505134T; Date of Mailing: Dec. 30, 2015.
International Search Report corresponding to Application No. PCT/JP2013/050235; Date of Mailing: May 14, 2013, with English translation.

* cited by examiner

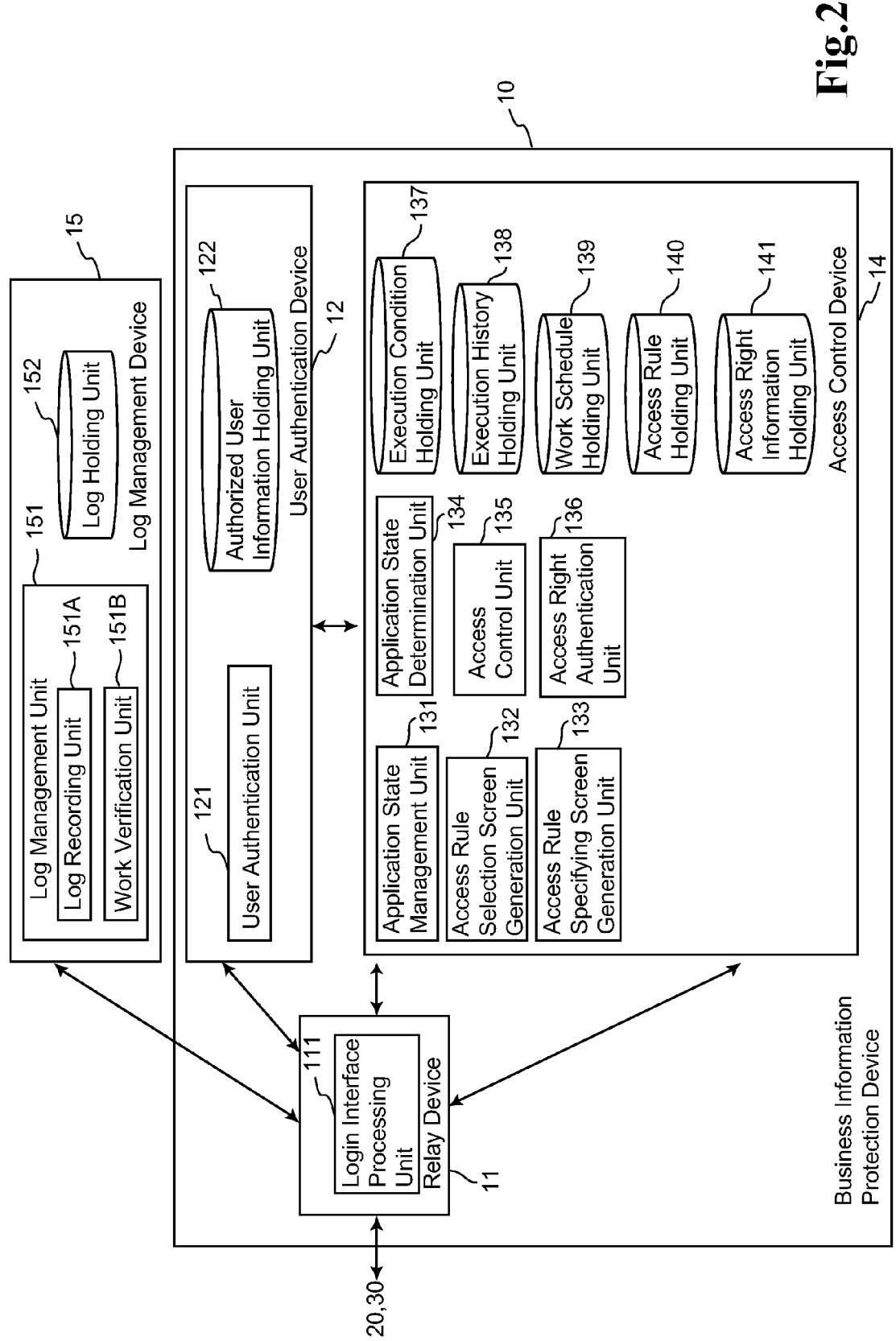

| | 137A | 137B | 137C | 137D | 137E | 137F |
|---|---|---|---|---|---|---|
| | Access Rule ID | Date | Time | Work Kind | Approval Necessity | Access Rule Name |
| | 1 | Business Day | 6:00→16:00 | 01: Failure Handling<br>02: Investigation | | Access Rule A |
| | 2 | Business Day | 6:00→16:00 | 03: Operation Monitoring<br>04: Release Work | ○<br>○ | Access Rule B |
| | 3 | Business Day | 16:00→6:00 | 01: Failure Handling<br>02: Investigation<br>03: Operation Monitoring<br>04: Release Work | <br><br><br>○ | Access Rule C |
| | 4 | 2006/9/26 | 12:00→13:00 | 03: Operation Monitoring | ○ | Access Rule B |
| | 5 | Non-Business Day | All Day | 01: Failure Handling<br>02: Investigation<br>03: Operation Monitoring<br>04: Release Work | <br><br><br>○ | Access Rule C |
| | ⋮ | ⋮ | ⋮ | ⋮ | ⋮ | ⋮ |

| Classification | Main Record Contents |
|---|---|
| HTTP/HTTPS | Access Start Date/Time, Port, Connection Source IP Address, User ID, URL, Connection Time |
| TELNET/SSH | Access Start Date/Time, Port, Connection Source IP Address, User ID, Connection Destination IP Address, Connection Time |
| FTP | Access Start Date/Time, Port, Connection Source IP Address, User ID, FTP Protocol Command, Connection Destination Information |
| RDP | Access Start Date/Time, Port, Connection Source IP Address, User ID, Connection Destination IP Address, Connection Time |
| CIFS | Access Start Date/Time, Port, Connection Source IP Address, User ID, Access Folder, Connection Time |
| Other Protocol | Access Start Date/Time, Port, Connection Source IP Address, Connection Destination IP Address, Connection Time |

152B

| Classification | Main Record Contents |
|---|---|
| HTTP/HTTPS | Transmitted Data, Received Data |
| TELNET/SSH | Received Data |
| FTP | Protocol Command, Transfer File |
| RDP | Transmitted/Received Data (Video Log), Keyboard Operation Log |
| CIFS | Transmitted Data, Received Data, Transfer File |

Access Application

- Policy Name: Policy 01 [Search] ~61
- Work Subject: Update Accounting System ~62
- System Classification: Financial ▽ ~63
- System Name: Financial Information System ~64
- Work Kind: 04 : Release Work ▽ ~65
- Contents: Update Tax Module To Deal With Tax Changes ~66
- Attachment: File 1 ▽ ~67
- Access Schedule: 2006/9/27 13:00 ~ 2006/9/27 15:00 ~68
- [Submit] ~69

Fig.6

Access Approval (Application 0048: Update Accounting System) — 80

Application Information — 81

| | |
|---|---|
| Applicant Name | : Yoshidashima Jun |
| Work Subject | : Update of Accounting System |
| System Classification | : Financial |
| System Name | : Financial Information System |
| Work Kind | : 04 : Release Work |
| Contents | : Update of Tax Module to deal with Tax Changes |
| Access Schedule | : September 27, 2006 (WEDNESDAY) 13:00~15;00 |
| Access Rule Name | : Access Rule A |

Approver Name: Ohno, Osamu — 82

Approval Requester: — 83

Communication Column: Thank you in advance.

[Approve] — 85   [Reject] — 86   84

Fig.8

Policy List

Policy ID : ▭ (partial match)
Policy Name: ▭ (partial match)
Administrator Role: ▭ (partial match)
Auditor Role: ▭ (partial match)
Approver Role: ▭ (partial match)
General User Role: ▭ (partial match)
Connection System: ▭ (partial match)
Protocol: [-- please select --▼]
Approval Level: [-- please select --▼]
Operation Log Acquisition: [-- please select --▼]

[Search] [Clear] [Return]

Policy Search Results — 91

| ☐ Policy ID | Policy Name | Operation Log Acquisition | Approval Level |
|---|---|---|---|
| ☐ base_policy | base_policy | use | in-advance application is required |
| ☐ deny_access_audit_policy | deny_access_audit_policy | use | in-advance application is required |
| ☐ notif_without_audit | notif_without_audit | use | in-advance application is required |
| ☐ policy_audit | policy_audit | use | in-advance application is required |
| ☐ policy 01 | policy01 | use | in-advance application is required (forcible disconnection) |

1-5 within 5 results

Fig.9

| Logout | ☐ Setting/Definition | | Administrator Menu |
|---|---|---|---|
| | | | Lastloging2009.12.04 11:35 |
| Log Search/Browse | 🔍 Log Search/Browse | ☐ hoct:acv33 r01 M☐ time2009.12.04 11:37 |
| [Access Log Search] Access History | | Download Manual ❓Help |

Search Criteria

| Search Criteria | |
|---|---|
| ■ Protocol: | TELNET ▼ |
| ■ Access Start Date/Time: | 2009.12.04  00:00  ~ 2009.12.04  23:59 |
| ■ User Account: | ex. secure (partial match) |
| ■ Connection Destination Client Address: | ex. 192.168.1.1 (partial match) |
| ■ Port No.: | (exact match) |
| ■ Connection Destination Server Information: | ex.http://xxxjp/,ID@hostname, 192.168.1.1 etc  (partial match) |
| ■ Outflow Data: | 0  bytes or more |
| ■ Inflow Data: | 0  bytes or more |
| ■ Connection Time: | 0  seconds or more |
| ■ Application No.: | (partial match) |
| ■ Limit to access storing full text log: | ☐ |
| ■ Used Command: | ex.STOR (partial match) |
| ※Search can be performed only in HTTP/FTP/CIFS | |
| ■ Include check target key word: | ☐ |
| ※Search can be performed only in HTTP/FTP/CIFS | |

( Search ) — 91

| Date /Time | Access End Date/Time | User Account | Connection Source Client Access | Port No. | Connection Destination Server Information |
|---|---|---|---|---|---|
| 29:31 | 2009.12.04 11:29:57 | testuser1 | 192.168.96.253 | 23 | 192.168.96.10:23 |
| 29:31 | 2009.12.04 11:29:57 | testuser1 | 192.168.96.253 | 23 | 192.168.96.10:23 |
| 29:31 | 2009.12.04 11:29:57 | testuser1 | 192.168.96.253 | 23 | 192.168.96.10:23 |
| 29:31 | 2009.12.04 11:29:57 | testuser1 | 192.168.96.253 | 23 | 192.168.96.10:23 |

100

ACCESS CONTROL DEVICE, ACCESS CONTROL METHOD, AND PROGRAM

This is the U.S. national stage of application No. PCT/JP2013/050235, filed on Jan. 9, 2013, the disclosure of which is also incorporated herein by reference.

TECHNICAL FIELD

The present invention relates to an access control device, an access control method, and a computer program.

BACKGROUND ART

A business information system supporting operations of companies, public facilities and the like, which is generally referred to as an enterprise system, has now become a basis of organizations in all sizes. The business information system supports a complex organizational management by outputting higher value-added information after aggregating, accumulating, analyzing, and processing data obtained from a node terminal and a database.

Such a business information system needs various types of maintenance work, such as access rule monitoring, failure handling, function extending, and function changing after the system starts operating. Normally, a client company which introduces a business information system entrusts an outside management company with maintenance work. A system engineer (SE) of the outside management company mainly remotely logins to the business information system and performs the maintenance work.

Incidentally, in recent years, the Sarbanes-Oxley (SOX) act enacted in the United States has strongly demanded to guarantee the validity of information disclosure from business managers and accounting auditors. Following the act, Japanese SOX is introduced in Japan and it is imperative to establish a system to deal with the Japanese SOX.

In consideration of the social background, various techniques to enhance information security of a business information system are proposed as described in Patent Literatures 1 to 5.

CITATION LIST

Patent Literature

{PTL 1} JP 2012-203624 A
{PTL 2} JP 2008-226057 A
{PTL 3} JP 2008-226058 A
{PTL 4} JP 2008-117316 B
{PTL 5} JP 2008-117317 B

SUMMARY OF INVENTION

Technical Problem

A system administrator of a business information system using a technique disclosed in Patent Literatures 1 to 5 specifies a company and department to which a user belongs, a position (role in charge), a node name (terminal name), a node group name (system name), and a policy (for example, various access rules, such as whether or not a log is acquired, whether or not a connection source IP address is restricted, designation of a connectable protocol, and whether or not in-advance approval is performed), whereby detailed access control of the user utilizing the business information system is implemented.

Incidentally, the system administrator may add and change access rules set to the user according to work contents by the user. Consequently, many access rules are set to the user. When the access control is performed under the combinations of these access rules tangled in complex, it is difficult for even the system administrator who has performed the setting to manage the access control. Furthermore, in this situation, it is also difficult for a person who performs an audit to understand whether or not the access control is appropriately performed in accordance with the access rule set to the user.

The present invention is made in consideration of the above described problems. A purpose of the present invention is to provide an access control device, an access control method, and a computer program which easily manage access control and confirm whether or not the access control is appropriately performed.

Solution to Problem

An aspect of the present invention relates to an access control device. That is, an access control device according to the present invention is to control access of a client terminal to a server constituting a predetermined system, the access control device comprising: a screen generation unit configured to generate selection screen information to select, from one or more access rules created by an administrator of the predetermined system, an access rule used by a user who logins to the client terminal; and an access control unit configured to execute access control of the user in accordance with an access rule selected from access rules displayed based on the selection screen information.

The access control device may comprise, in addition to the above described configuration, a first storage unit configured to store one or more access rules created by an administrator of the predetermined system; and a second storage unit configured to store an access rule, selected by a user from one or more access rules displayed based on selection screen information generated by the screen generation unit, as an access rule which is applied at executing access control of the user.

In addition to the above described configuration, the screen generation unit may refer the second storage unit, in response to an inquiry request from the client terminal about an access rule allowed for a user, to specify the access rule allowed for the user, and generate specifying screen information indicating a name for specifying an access rule associated with the user who has requested the inquiry or a predetermined user group to which the user belongs.

The access control device may comprise, in addition to the above described configuration, a rule search assist unit configured to search for an access rule stored in the first storage unit, wherein the rule search assist unit is configured to generate screen information, in response to a request from a user for searching for an access rule, on which the access rule is able to be searched for by specifying a name of the access rule or a name of a connection destination node.

The access control device may comprise, in addition to the above described configuration, a rule search assist unit configured to search for an access rule stored in the first storage unit is provided, wherein the rule search assist unit is configured to generate screen information indicating an access rule which has been used by the user or a predetermined user group to which the user belongs.

Another aspect of the present invention relates to an access control method. That is, an access control method according to the present invention is to control access from a client terminal to a server constituting a predetermined system, the method including: a screen generation step of generating selection screen information to select, from one or more access rules created by an administrator of the predetermined system, an access rule used by a user who logins to the client terminal; and an access control step of executing access control of the user in accordance with an access rule selected from access rules displayed based on the selection screen information.

Another aspect of the present invention relates to a computer program. That is, a computer program according to the present invention is to function as an access control device which controls access from a client terminal to a server constituting a predetermined system, the computer program causes the computer to function as: screen generation means for generating selection screen information to select, from one or more access rules created by an administrator of the predetermined system, an access rule used by a user who logins to the client terminal; and access control means for executing access control of the user in accordance with an access rule selected from access rules displayed based on the selection screen information.

Advantageous Effects of Invention

According to the present invention, it is possible to provide an access control device, an access control method, and a program which easily manage access control and confirm whether or not the access control is appropriately performed.

BRIEF DESCRIPTION OF DRAWINGS

FIG. 2 is a block diagram showing a functional configuration example of a business information protection device shown in FIG. 1.

FIG. 3 is a diagram showing a data configuration example of execution condition information in an execution condition holding unit shown in FIG. 2.

FIG. 4 is a diagram showing an example of record contents of an access log held in a log holding unit.

FIG. 6 is a diagram showing an access application screen example.

FIG. 8 is a diagram showing an access approval screen example.

FIG. 9 is a diagram showing a screen example displayed when a system administrator searches for a policy name.

FIG. 14 is a diagram showing an access log search screen example.

DESCRIPTION OF EMBODIMENTS

[Configuration of Business Information System]

Figure 1:
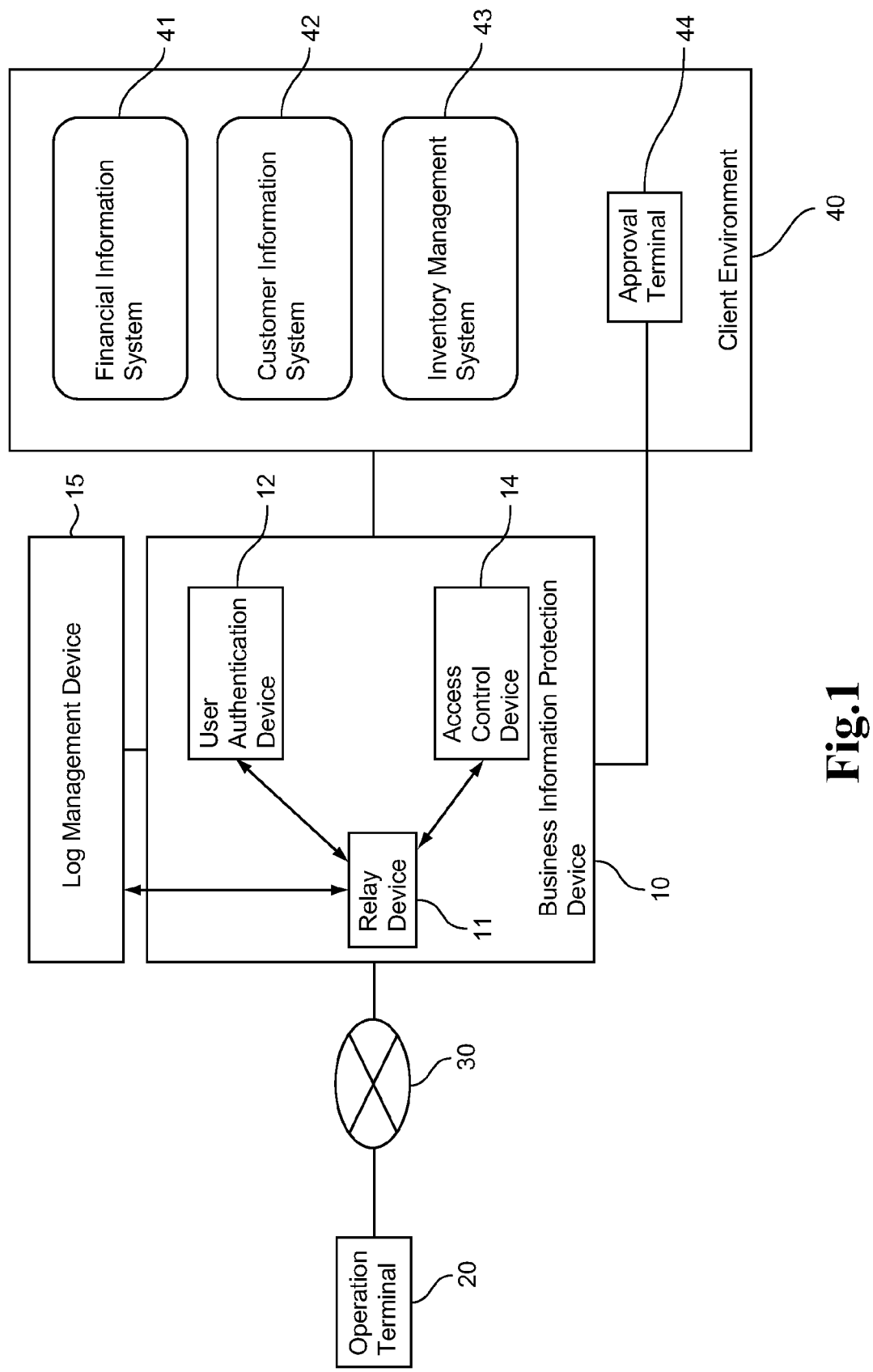
FIG. 1 is a block diagram showing a configuration example of a business information system including an embodiment of an access control device of the present invention.

FIG. 1 is a block diagram showing a configuration example of a business information system including an embodiment of an access control device of the present invention. In the business information system shown in FIG. 1, a business information protection device 10 and an operation terminal 20 are connected each other via a network 30 and a client environment 40 is connected to the network 30 via the business information protection device 10. Furthermore, a log management device 15 is also connected to the business information protection device 10.

In the business information system shown in FIG. 1, the client environment 40 indicates a business environment of a company A. Various business systems of the client environment 40 properly receive maintenance work after the systems start operating. The maintenance work is performed in the client environment 40 in some cases, but mainly performed by being remotely accessed from the operation terminal 20. Hereinafter, a user who performs the remote maintenance work is simply referred to as a "worker". The most of workers are generally system engineers (SE) of a management company having an agreement with the company A on the maintenance work, but some of workers are the employees of the company A. A worker logins to the operation terminal 20 using a user assigned to oneself and remotely logins to the various business information systems of the client environment 40 via the network 30 and the business information protection device 10. It is preferable that a communication path between the operation terminal 20 and the business information protection device 10 is a safe communication path such as a virtual private network (VPN).

In the following description, it is assumed that the network 30 is remotely accessed via a public line such as the internet or a local area network (LAN). However, the business information protection device 10, the client environment 40, and the operation terminal 20 may be connected each other via a dedicated line.

Furthermore, in this description, terms of a "client company" and a "client environment" are used to indicate a client which executes organizational business by operating various business information systems and receives a service of maintenance work from the external operation terminal 20. Furthermore, a term of "access control" in this description mainly intends access control by computer security and indicates whether or not a subject (such as an active body and a client terminal) is permitted to perform processing (for example, reading/writing/executing a file) to which object (such as, a system, a file, and a server), or that control of permitted access means (for example, a usable protocol and port of a server) is performed. Note that, access control by computer security generally includes authentication, authorization, and an audit, but access control may include other processing or may not include all of the processing.

The business information protection device 10 all remote login requests from the operation terminal 20 to the client environment 40 and is placed on a network security boundary. The business information protection device 10 performs access control of communication protocols, such as a telecommunication network (TELNET), a secure shell (SSH), a file transfer protocol (FTP), a hypertext transfer protocol (HTTP), a hypertext transfer protocol security (HTTPS), a Windows remote desktop protocol (WindowsRDP) and a common internet file system (CIFS), and does an audit by acquiring logs.

The business information protection device 10 permits a remote login from the operation terminal 20 to the client environment 40, on the conditions that positive determination is obtained in both of the following two steps:

1. Whether the worker is a user who has been registered beforehand (hereinafter, referred to as "user authentication"); and 2. Whether the worker has (appropriately) submitted an application for the maintenance work beforehand (hereinafter, referred to as "application determination").

The business information protection device 10 includes a relay device 11, a user authentication device 12, and an access control device 14. Note that, the business information protection device 10 may be a single device integrally equipped with the functions of the relay device 11, the user authentication device 12, and the access control device 14.

When being accessed from the operation terminal 20 via the network 30, the relay device 11 confirms an IP address and a host name of the operation terminal 20. If the terminal is not a connection permission target, the relay device 11 immediately disconnects and does not permit the connection. On the other hand, if the terminal is the connection permission target, the relay device 11 requests a user ID and a password from the operation terminal 20 and supplies the user ID and the password, which are transmitted in return to the request, to the user authentication device 12 and the access control device 14 in order to request for confirmation.

The user authentication device 12 executes the "user authentication" in succession to the relay device 11. First, the user of the operation terminal 20 remotely logins to the relay device 11. At this time, the user ID and the password are transmitted to the relay device 11 via the network 30. The user authentication device 12 receives the user ID and the password from the relay device 11, executes the user authentication, and returns the result to the relay device 11.

The access control device 14 receives the user ID and the password from the relay device 11 and executes the "application determination". The worker must submit an application about how and when the work is to be executed before the remote login to the business information system. The access control device 14 manages such a work schedule in an integrated fashion and confirms, when receiving the remote login request from the worker, whether or not the worker has submitted any application for the maintenance work beforehand.

Furthermore, the access control device 14 executes "access right authentication" instead of the relay device 11. That is, the access control device 14 receives the user ID, the password, and information indicating an access destination (such as an IP address and a host name) from the relay device 11, executes the authentication whether or not the user is permitted to connect the access destination (the user has an access right), and returns the result to the relay device 11. The conditions to permit the access to the business information system are that the user authentication has succeeded and the application for the work has been submitted.

Note that, the worker transmits work application information to the access control device 14 via the operation terminal 20 before the maintenance work in the client environment 40 is started (hereinafter, the processing is referred to as "access application"). The work application information is an input data set, such as a work purpose, a work date/time, a work subject, an access target system name, and an applied access rule name. In addition, the work application information may include supplementary information besides the input data, such as a mail address of an applicant and an application date/time. Note that, the above described access rule means any one of, or a control rule of a combination of policies created by combining a plurality of, a name of a user who performs the maintenance work, a name of a user group to which the user who performs the maintenance work belongs (role name), a name of a node in which the maintenance work is executed, a name of a node group to which the node in which the maintenance work is executed belongs (system name), ON/OFF of log acquisition, restriction of a connection source IP address, a connectable protocol, or/and whether or not in-advance approval is performed.

Note that, the "access application" has been executed by the operation terminal 20, but the execution of the access application is not limited to this and the access application may be executed by, for example, an application terminal (not shown) different from the operation terminal 20.

Furthermore, the access control device 14 can execute the access control of the user based on the access rule in the "access application" submitted by the user. Note that, the access rule has been created and set beforehand by a system administrator of the client environment 40. The user can select an applied access rule from the access rules created and set by the system administrator according to work contents, an employment position, and the like (the details will be described later).

Each of the relay device 11, the user authentication device 12, and the access control device 14 includes two servers of a primary server and a secondary server and has a failover function. That is, when a failure occurs in the primary server for some reason, an IP address of the primary server is added to the secondary server. More specifically, each of the primary server and the secondary server possesses a real IP and a virtual IP, and the secondary server monitors the primary server and acquires the virtual IP of the primary server when detecting an abnormality. The worker is made to access the virtual IP and the access is automatically switched from the primary server to the secondary server when an abnormality occurs. Thus, the worker can continuously use the service with the secondary server without being aware that a failure occurs in the primary server.

The log management device 15 acquires and manages the contents of the access performed in the relay device 11. For example, a "summary log" such as an access date/time and an IP address, and a "full-text log" of the transmitted/received data are acquired and managed.

The log management device 15 manages work application contents managed by the access control device 14 in association with an access log managed by the log management device 15 and can easily perform access check. The access check means a log audit as to whether the access is performed in accordance with the submitted application by investigating the access log. Note that, the log management device 15 and the business information protection device 10 may be a single device.

When a user ID and a password are input by the worker to remotely login to the client environment 40, the operation terminal 20 transmits, to the business information protection device 10 via the network 30, the user ID and the password as a remote login request.

The client environment 40 includes three business information systems of a financial information system 41, a customer information system 42, and an inventory management system 43 and one or more approval terminals 44. The financial information system 41 manages the financial information of the company A. The customer information system 42 manages the customer information of the company A. The inventory management system 43 manages the products inventory of the company A. The approval terminal 44 is a common PC terminal equipped with a web browser. The approval terminal 44 does not necessarily belong to the client environment 40 and may be a mobile terminal such as a laptop PC.

FIG. 2 is a block diagram showing a functional configuration of the business information protection device 10 and the log management device 15.

The respective blocks shown in FIG. 2 are implemented by an element such as a CPU, and storage units such as a RAM, a ROM, and an HDD for hardware, and by a computer program for software. However, in FIG. 2, the respective blocks show functions implemented by cooperation with them. Therefore, these functional blocks can be implemented in various ways according to the combinations of hardware and software.

A: Relay Device 11

A login interface processing unit 111 of the relay device 11 accepts the remote login request from the operation terminal 20. The remote login request includes the user ID and the password. The relay device 11 transfers the accepted user ID and password to the user authentication device 12 for user authentication processing and to the access control device 14 for application determination processing and access right authentication processing. Furthermore, when acquiring information indicating the access destination (such as an IP address and a host name) from the operation terminal 20, the login interface processing unit 111 transfers the acquired information to the access control device 14 for the access right authentication processing. Then, the login interface processing unit 111 receives the respective determination results from the user authentication device 12 and the access control device 14. Hereinafter, data to identify a user, such as a user ID and a password, is referred to as "user identification information". As a modification, the user identification information may be biological information such as a finger print and an iris.

The relay device 11 may not be a single device. For example, a relay device 11 of the financial information system 41 may be different from a relay device 11 of the customer information system 42. Alternatively, the worker may access a target business information system via an arbitrary relay device 11 among a plurality of relay devices 11. It is preferable in load distribution and availability to provide a plurality of relay devices 11. Similarly, a plurality of user authentication devices 12 and access control devices 14 may be provided in consideration of load distribution and availability.

B: User Authentication Device 12

The user authentication device 12 includes a user authentication unit 121 and an authorized user information holding unit 122. When the login interface processing unit 111 of the relay device 11 accepts the remote login request, the user authentication unit 121 acquires the user ID and the password from the login interface processing unit 111. Then, by determining whether the user of a transmission source is registered as an authorized user in the authorized user information holding unit 122, the user authentication unit 121 executes the user authentication. The authorized user information holding unit 122 holds authorized user information associated with the user ID and the password. The user registered in the authorized user information is referred to as an "authorized user". The user authentication unit 121 executes the user authentication of an approver as well as the worker, the details of which will be described later. Note that, the user information holding unit 122 is mounted inside the user authentication device 12, but is not limited to this and may be mounted in an external device such as a lightweight directory access protocol (LDAP) server.

The user authentication device 12 in the present embodiment is a single device and manages the user identification information in an integrated fashion. By executing the user authentication to connect a plurality of related persons with a plurality of business information systems with the single user authentication device 12, it is easy to manage a user authentication policy. However, an authorized user managed by the user authentication device 12 may be managed as a different user from a user of the financial information system 41, the customer information system 42, and the inventory management system 43 of the client environment 40.

C: Access Control Device 14

The access control device 14 accepts the "access application" from the user and has a function to perform the "application determination" based on the work application information registered according to the "access application".

The access control device 14 includes an application state management unit 131, an access rule selection screen generation unit 132, an access rule specifying screen generation unit 133, an application state determination unit 134, an access control unit 135, an access right authentication unit 136, an execution condition holding unit 137, an execution history holding unit 138, a work schedule holding unit 139, an access rule holding unit 140, and an access right information holding unit 141.

The application state management unit 131 performs processing related to the "access application". When receiving the work application information from the operation terminal 20, the application state management unit 131 determines whether the information matches execution condition information (not shown) registered in the execution condition holding unit 137. When determining that the work application information does not match the execution condition information, the application state management unit 131 rejects the application and notifies the worker of the operation terminal 20 of the rejection. On the other hand, when determining that the work application information matches the execution condition information, the application state management unit 131 registers the work of the submitted application in the work schedule information in the work schedule holding unit 139. The work application registered in the work schedule information in this way is referred to as "valid work application". The contents of the work schedule information may be substantially equal to the contents of the work application information. That is, only the work application information satisfying the requirement for the valid work application in the received work application information is formally registered as the "work schedule information" in the work schedule holding unit 139.

When the valid work application is submitted, the application state management unit 131 assigns an application number (work ID) to uniquely identify the work. In the work schedule information, an application number, a work schedule date/time, work contents, a worker name, an approval state, a name of an applied access rule, and the like are associated. There are two types of maintenance work; one of which can be started if only the valid work application is performed and the other one of which cannot be started unless the approval is performed. This may be defined as a part of the execution condition information. Note that, in the work schedule information registered in the work schedule holding unit 139, the application state of the work which expires the work schedule date/time becomes an application history in which the application has been submitted in the past and the application state of the rejected application is recorded as "rejected".

When the valid work application is registered in the work schedule holding unit 139, the application state management unit 131 determines whether or not the work contents of the submitted application requires approval with reference to the execution condition information registered in the execution condition holding unit 137. When the application for the maintenance work is submitted, the application state management unit 131 notifies the approver of the application number. The application state management unit 131 in the present embodiment sends an e-mail including the application number to the approval terminal 44. When receiving the notification, the approver operates an input unit (not shown) of the approval terminal 44, accesses the access control device 14 of the business information protection device 10 based on the application number, and inputs whether or not the application is approved.

The application state management unit 131 accepts whether or not the application is approved from the approval terminal 44. When the application is approved, the application state management unit 131 changes the approval state of the work schedule information registered in the work schedule holding unit 139 from "unapproved" to "approved". When the application is rejected, the application state management unit 131 notifies the worker of the rejection of the application and records the application state of the work schedule information registered in the work schedule holding unit 139 as "rejected".

The access rule selection screen generation unit 132 generates screen information to select an access rule. The system administrator can select an access rule available to the user from one or more access rules displayed based on the screen information generated by the access rule selection screen generation unit 132. Note that, in order to further reduce a management load of the system administrator, the access rule selection screen generation unit 132 has functions to generate setting screen information to set an administrator of the respective access rules and assist screen information to search for an access rule with a "policy name", a "user name", and a "connection node name" which have high degree of recognition by a system administrator.

The access rule specifying screen generation unit 133 generates specifying screen information which indicates the access rule available to the user when the application state management unit 131 accepts the "access application". The system administrator selects one of the access rules displayed based on the selection screen information generated by the above described access rule selection screen generation unit 132, whereby the access rule displayed based on the specifying screen information is determined. When the specified access rule is selected by the user from the access rules, the specified access rule is held as the execution condition information in the execution condition holding unit 137, the details of which will be described later. Then, the access control of the user is executed in accordance with the specified access rule. Note that, the access rule specifying screen generation unit 133 has a policy search function for the user to search for the specified access rule with a policy name as a key.

The application state determination unit 134 executes the "application determination". When the remote login request is accepted from the worker, the application state determination unit 134 determines whether or not the work application has been submitted with reference to the user identification information acquired from the login interface processing unit 111 and the work schedule information registered in the work schedule holding unit 139. The application state determination unit 134 further determines whether or not the reception data/time of the remote login request is within the work time of the submitted application. For example, when the application designates the work schedule time as "10:00~11:00", the remote login request before 10:00 or after 11:00 is not permitted since the application determination result is determined as "negative".

When both results of the "user authentication" and the "application determination" are determined as positive, the access control unit 135 permits a communication path of the access from the operation terminal 20 to the client environment 40. Obviously, when the application for the maintenance work which requires approval has been submitted, the access is not permitted unless the application is approved. Note that, the access control unit 135 continuously executes the access control of the operation terminal 20 after the communication path is permitted, based on the execution condition information held in the execution condition holding unit 137, the details of which will be described later. Thus, the access control in accordance with the access rule permitted by the system administrator is realized.

When the login interface processing unit 111 of the relay device 11 accepts the remote login request, the access right authentication unit 136 acquires the user ID, the password, and the information indicating the access destination (such as an IP address and a host name) from the login interface processing unit 111 and determines whether or not the user of the transmission source is permitted to connect the access destination (the user has an access right) based on an access application state registered in the access right information holding unit 141.

The execution condition holding unit 137 holds, as the execution condition information of the maintenance work, the access rule selected from the screen displayed based on the screen information generated by the above described access rule specifying screen generation unit 133. FIG. 3 shows a data configuration of the execution condition information in the execution condition holding unit 137 shown in FIG. 2.

FIG. 3 is a diagram showing a data configuration example of the execution condition information in the execution condition holding unit 137. The execution condition information is the access rule decided by the administrator of the respective business information systems. An access rule ID column 137A shows an ID to uniquely identify the access rule (hereinafter, referred to as an "access rule ID"). The access rule ID is assigned when the access rule is registered. A date column 137B shows a date on which the access rule is applied. A time column 137C shows a time at which the access rule is applied. For example, the access rule of the access rule ID "1" indicates that the access rule is applied on a business day of the company A and at a time frame of "6:00~16:00".

A work kind column 137D shows a work kind of the maintenance work to which the access rule is applied. An approval necessity column 137E shows whether or not the approval to execute the work is required. In the example of FIG. 3, if the approval is required, the column is marked with "o", and if the approval is not required, the column is blank. An access rule name column 137F shows a name of the access rule which is applied to the work of the access application. Note that, the access rule name may be a policy name, the details of which will be described later. In the example of FIG. 3, for example, the access rule A of the access rule ID "1" is applied to the maintenance work to be performed during "6:00~16:00" on a "business day" for "failure handling" of a work kind "01" and for "investigation" of a work kind "02", and these work kinds do not require the approval. That is, to perform the maintenance work for failure handling during "6:00~16:00" on the business day as a work schedule date/time, the worker only requires to submit the work application indicating that beforehand and does not require the approval.

Furthermore, the access rule B of the access rule ID "2" is applied to the maintenance work to be performed during "6:00~16:00" on a "business day" for "operation monitoring" of a work kind "03", and the maintenance work to be performed for "release work" of a work kind "04", and these work kinds require the approval. That is, to perform the maintenance work during "6:00~16:00" on a business day for the "operation monitoring" and the "release work", the access cannot be performed unless the work application and the approval are performed. For example, it is assumed that a worker performs the remote access request during "6:00~16:00" on a business day of a date/time T. At this time, the results of the application determination based on the execution condition information shown in the example of FIG. 3 are as follows.

1. When the submitted application for the work does not include the date/time T within a work schedule time, the application is determined as negative.

2. When the submitted application for the failure handling work includes the date/time T within a work schedule time, the application is determined as positive.

3. When the submitted application for the operation monitoring work includes the date/time T within a work schedule time, the application state determination unit 134 determines the application as positive when the submitted application for the operation monitoring work has been approved with reference to the work schedule holding unit 139. When the application has been unapproved or rejected, the application is determined as negative.

The access control device 14 can specify the access rule corresponding to the user and execute the access control by referring to the execution condition information shown in FIG. 3.

The execution history holding unit 138 holds, as execution history information, a combination of the name of the access rule used at performing the maintenance work and the hash value calculated based on the data indicating the access rule name. Thus, if the access rule name recorded as the execution history information is changed after the maintenance work, by confirming the hash value recorded as the combination of the access rule name, it is possible to confirm whether or not the access rule name has been actually used. That is, it is possible to ensure the integrity of the execution history information. Furthermore, by only referring to the execution history information held in the execution history holding unit 138, it is possible to confirm how the access control has been performed. That is, it is easy to audit the access control of the user. Note that, the execution history information held in the execution history holding unit 138 may be stored in the log management device 15, the details of which will be described later.

The work schedule holding unit 139 holds the work schedule information satisfying the requirement for the valid work application and formally registered in the application state management unit 131.

The access rule holding unit 140 holds access rule information created beforehand by the system administrator.

The access right information holding unit 141 holds the access application state associated with the information indicating the user ID and the access destination.

D: Log Management Device 15

The log management unit 151 manages the access log from the operation terminal 20 to the client environment 40. The log management unit 151 includes a log recording unit 151A and a work verification unit 151B. The log recording unit 151A records, as the access log, the execution of the remote login request, commands and data transmitted/received between the operation terminal 20 and the business information system, the execution date/time and the applied access rule name, and the like. When recording, the log recording unit 151A associates the application number assigned by the application state management unit 131 with the access log of the work application contents corresponding to the application number. Furthermore, the log recording unit 151A records a denial history log, such as authentication failure, unsubmitted application, no access right, and the like.

The work verification unit 151B checks whether unauthorized access is performed comparing the access log contents held in a log holding unit 152 with the work schedule information corresponding to the application number associated with the access log and registered in the work schedule holding unit 139.

For example, although the work application for "operation monitoring" has been submitted, when file rewriting processing is performed, the work verification unit 151B detects such unauthorized access with reference to the access log held in the log holding unit 152. The work verification unit 151B notifies the approval terminal 44 of the unauthorized access or the access suspected as unauthorized access. Alternatively, when the unauthorized access is detected, the access control unit 135 may forcibly prohibit the remote access.

The log holding unit 152 holds the application number assigned by the application state management unit 131 in association with the access log of the work application contents corresponding to the application number. The record contents of the access log held in the log holding unit 152 will be described with reference to FIG. 4.

FIG. 4 is a diagram showing an example of record contents of the access log held in the log holding unit 152. The log holding unit 152 includes a summary log recording area 152A and a full text log recording area 152B, and holds two types logs of a summary log and a full text log. The summary log includes a start/end time of access, a using terminal, an IP address and a host name of an access destination server, a using ID, a connection time, and the like. The full text log includes contents of commands actually executed and operated.

In the example of FIG. 4, the summary log recording area 152A and the full text log recording area 152B hold respective main record contents for each protocol. For example, in the case of "TELNET" protocol, the summary log recording area 152A records an access start date/time, a port, a connection source IP address, a user ID, a connection destination IP address, and a connection time and the full text log recording area 152B records received data.

The above described record contents of the access log are associated with the application number and held in the log holding unit 152. Note that, the access log acquired by the Windows RDP is recorded in a video form. Furthermore, the log management device 15 may record an access rule name, an access rule ID, and the like.

Figure 5:
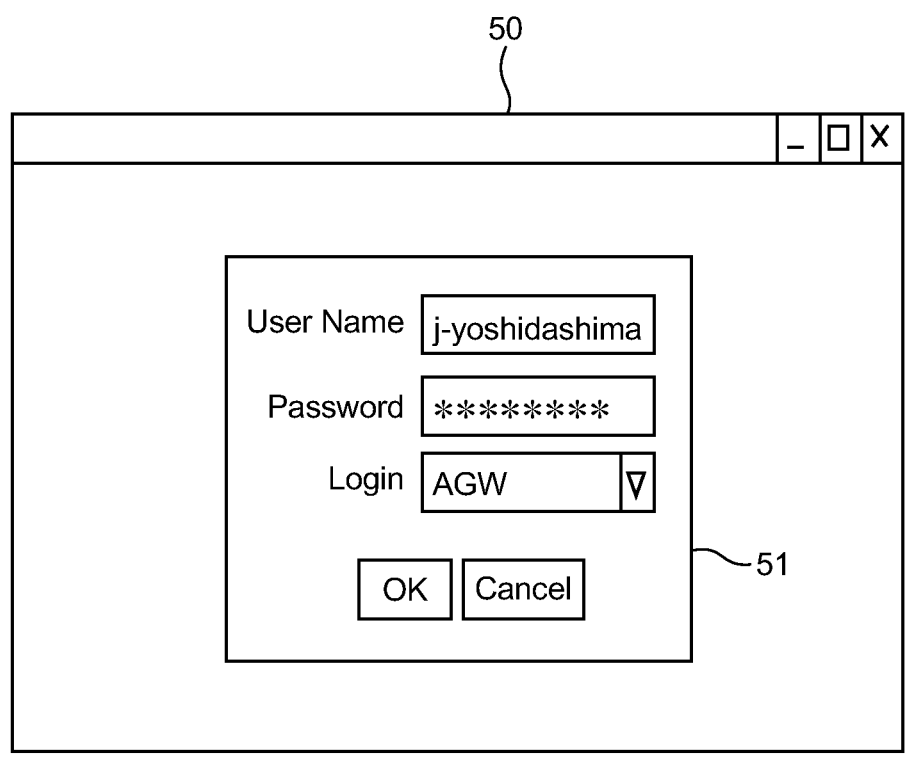
FIG. 5 is a diagram showing a login screen example.

FIG. 5 is a diagram showing a login screen example. A login screen 50 shown in FIG. 5 is displayed on the operation terminal 20 when a remote login request from the operation terminal 20 to the relay device 11 is performed. When receiving the remote login request, the relay device 11 displays a login window 51 in the login screen 50 on the operation terminal 20. That is, the login interface processing unit 111 of the relay device 11 supplies a user interface screen of the operation terminal 20. The user of the operation terminal 20 inputs the user ID and the password on the login window 51 displayed in the login screen 50. Although the user sees the same user interface as that supplied by the conventional terminal server, the input user identification information is supplied to the user authentication by the user authentication device 12, and to the application determination and the access right authentication by the access control device 14.

FIG. 6 is a diagram showing an access application screen example. An access application screen 60 shown in FIG. 6 is displayed on the operation terminal 20 when the worker accesses the access control device 14 from the operation terminal 20 for the work application. That is, when being accessed from the operation terminal 20, the application state management unit 131 displays the access application screen 60 on the operation terminal 20.

A policy search button 61 can search for a policy name available to the applicant. Note that, the policy name may be the same as the access rule name recorded in the access rule name column 137F described in FIG. 3. Note that, the applicant can directly input the policy name applied to the work to be performed by the applicant. A subject area 62 is used to input the work subject of the work application to be submitted. From a system classification area 63, a type of the target business information system is selected. Here, the financial information system 64 is selected. The access control unit 135 may prohibit the user's access to a system other than the selected business information system during the application date/time.

A system name area 64 shows a business information system name, and a work kind area 65 shows a work kind. A contents input area 66 is used to freely describe the work contents. An attachment file area 67 is used to attach an electronic file, such as a manual to be used. An access schedule date/time area 68 shows a work schedule date/time. The worker inputs data to the respective items shown in the application screen 60 and thereafter clicks an application submit button 69. Then, the operation terminal 20 transmits the input data as the work application information to the access control device 14.

When submitting the access application, by selecting an applicant name, a work subject, system classification, a system name, a work kind, contents, an access schedule date/time, attachment of an electronic file such as a manual to be actually used, and an applied policy name, it is possible to manage the work application information and an accompanied electronic file in an integrated fashion.

Figure 7:
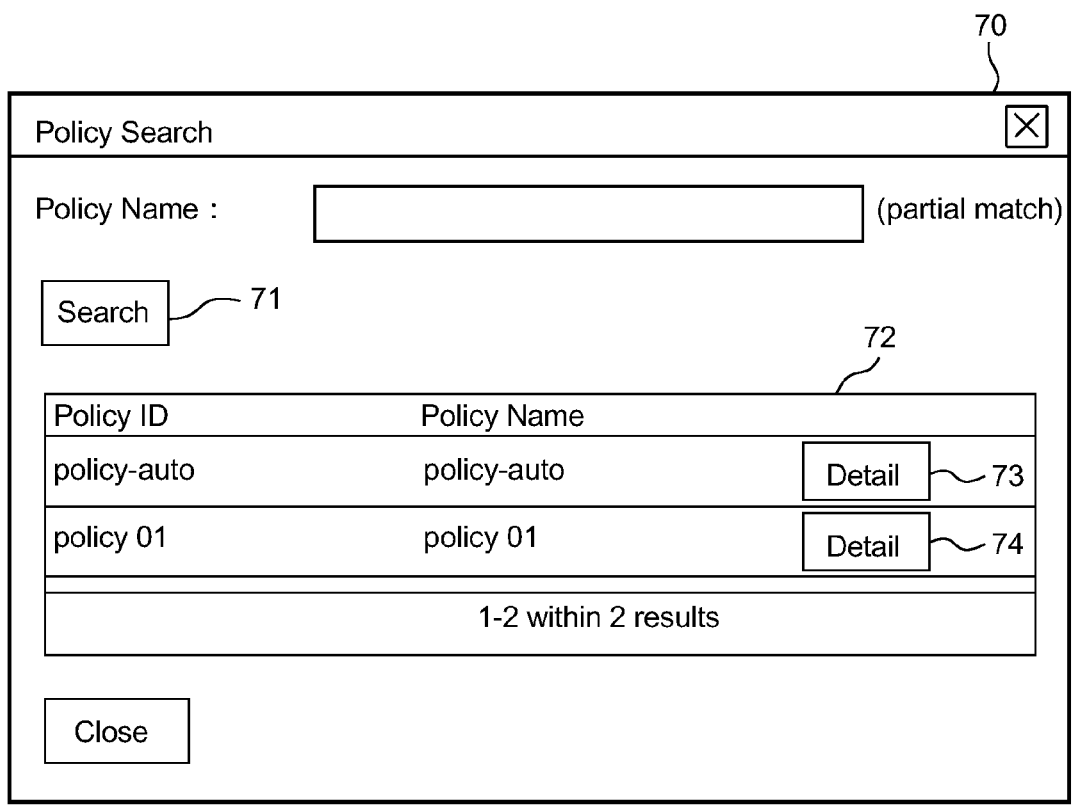
FIG. 7 is a diagram showing a screen example displayed when an access applicant searches for a policy name.

FIG. 7 is a diagram showing a screen example displayed when the user submitting the access application searches for the policy name. A policy search screen 70 shown in FIG. 7 is a screen example displayed on the operation terminal 20 when the policy search button 61 described in FIG. 6 is pushed. In the policy search screen 70, when the user input a part of the policy name and pushes a search button 71, corresponding policy names available to the user are listed in a list display area 72. Note that, by pushing detail buttons 73 and 74 disposed next to the listed policy name, the detailed information of the corresponding policy is displayed in another screen (not shown). Note that, when the search button 71 is simply pushed without inputting a search name of the policy name, policy names which have been used by the user or a user group to which the user belongs may be searched for.

FIG. 8 is a diagram showing an access approval screen example. An access approval screen 80 shown in FIG. 8 is displayed on the approval terminal 44 when the work application which requires the approval is submitted. That is, when the work application which requires the approval is submitted, the application state management unit 131 notifies the approval terminal 44 of the application number. When the approver accesses the access control device 14 designating the application number, the application state management unit 131 displays the access approval screen 80 as a web page on the approval terminal 44.

An application information area 81 shows the application contents input to the access application screen 60. An approver name area 82 is used to input an approver name. An approval requester name area 83 is used to input a name of the user who has requested the approval. For example, when a user B having an approval authority requests the approval from a user C, the user C performs approval determination on behalf of the user B. This is a measure to deal with a particular situation in which, for example, the user B is on vacation.

A communication column 84 is used to input a message to the work applicant and may be used to input a reason for application rejection or a condition and an order for the work contents at approving the application. An approval button 85 is for approval, and a rejection button 86 is for rejection. When either of the approval button 85 or the rejection button 86 is clicked, data indicating the input contents and whether or not the application is approved is transmitted to the access control device 14. The application state management unit 131 transmits the data to the operation terminal 20 by, for example, an email.

FIG. 9 is a diagram showing a screen example displayed when the system administrator searches for the policy name. As shown in a policy list screen 90 in FIG. 9, by inputting some of or full of items (for example, a policy name, a connection system) which have high degree of recognition by a system administrator, the corresponding access rule can be searched for. In the example shown in FIG. 9, the policy name can be searched for from partially matched items constituting the access rule. Note that, the policy to be displayed as the search result is displayed in a policy search result display area 91. Then, by clicking the policy name displayed in the policy search result display area 91, the detailed information of the policy is displayed in another screen (not shown). Note that, the policy list screen 90 shown in FIG. 9 may be displayed not only when a system administrator searches for a policy name but also when a user searches for a policy (or an access rule). When a user searches for a policy name (for example, in the case of the access application described in FIG. 6), access rules which have been used by the user or a predetermined user group to which the user belongs may be displayed in the policy search result display area 91.

Figure 10:
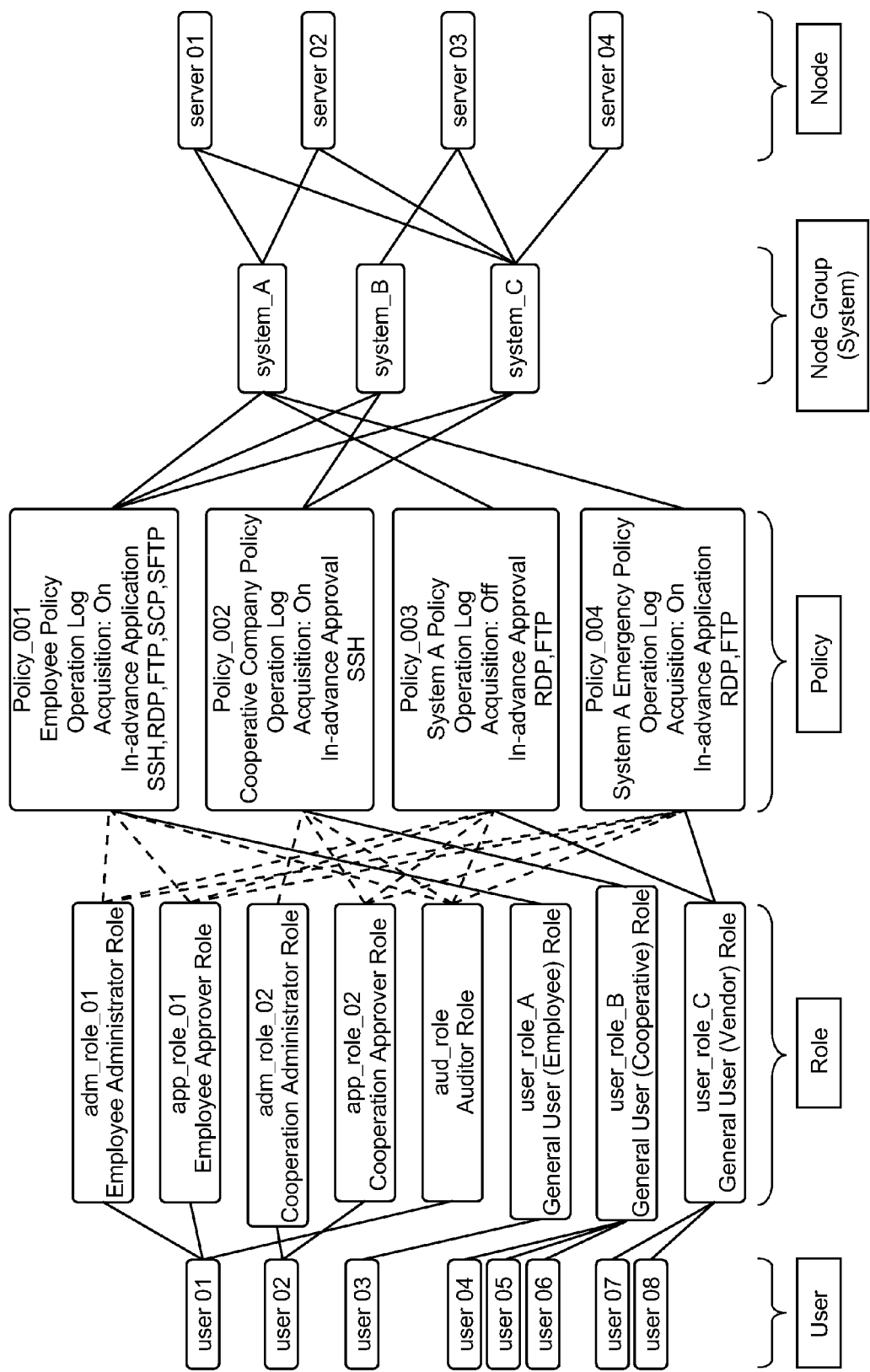
FIG. 10 is a diagram describing a concrete example of a selectable access rule in FIGS. 6 and 8.

FIGS. 10 to 13 are diagrams describing concrete examples of selectable access rules in FIGS. 6 and 8. The access rule includes, for example as shown in FIG. 10, a node group name (system name), a node name (terminal name), a policy configured with combinations of various rules, such as a role which is decided according to a company and department to which the user belongs and a position, whether or not a log is acquired, whether or not a connection source IP address is restricted, designation of a connectable protocol, and whether or not in-advance approval is performed. Note that, in FIG. 10, a "user" object indicates the user itself and a "node" object indicates an access destination server itself.

As "role" objects, an employee administrator role, an employee approver role, a cooperation administrator role, an auditor role, a general user (employee) role, a general user (cooperation) role, and a general user (vendor) role are defined. By setting the objects defined as these respective roles to "user" objects, it is possible to set and change the access control to a folder and a file in a work target server not in units of users but in units of roles. Note that, a plurality of "role" objects can be set to the "user" object.

Furthermore, as "policy" objects, an employee policy, a cooperation company policy, a system policy, and a system emergency policy are defined. In the "policy" object, ON/OFF of operation log acquisition, whether or not in-advance approval is performed, and a usable protocol are defined according to work contents, a position, and the like. For example, the employee policy is associated with the employee administrator role, the employee approver role, the auditor role, and the general user (employee) role, and when these roles are used, it is possible to execute the access control in accordance with the contents defined by the employee policy. Note that, a plurality of "policy" objects can be set to the "role" object.

Furthermore, as a "node group" object, a name of the information system used by the company A is defined. In the example shown in FIG. 10, three information system names of a system_A, a system_B, and a system_C are defined. The "node group" object is defined in units of nodes (servers) constituting the information system. For example, the system_A is associated with a server01 and a server02. Note that, a plurality of "node group" objects can be set to the "node" object.

Figure 11:
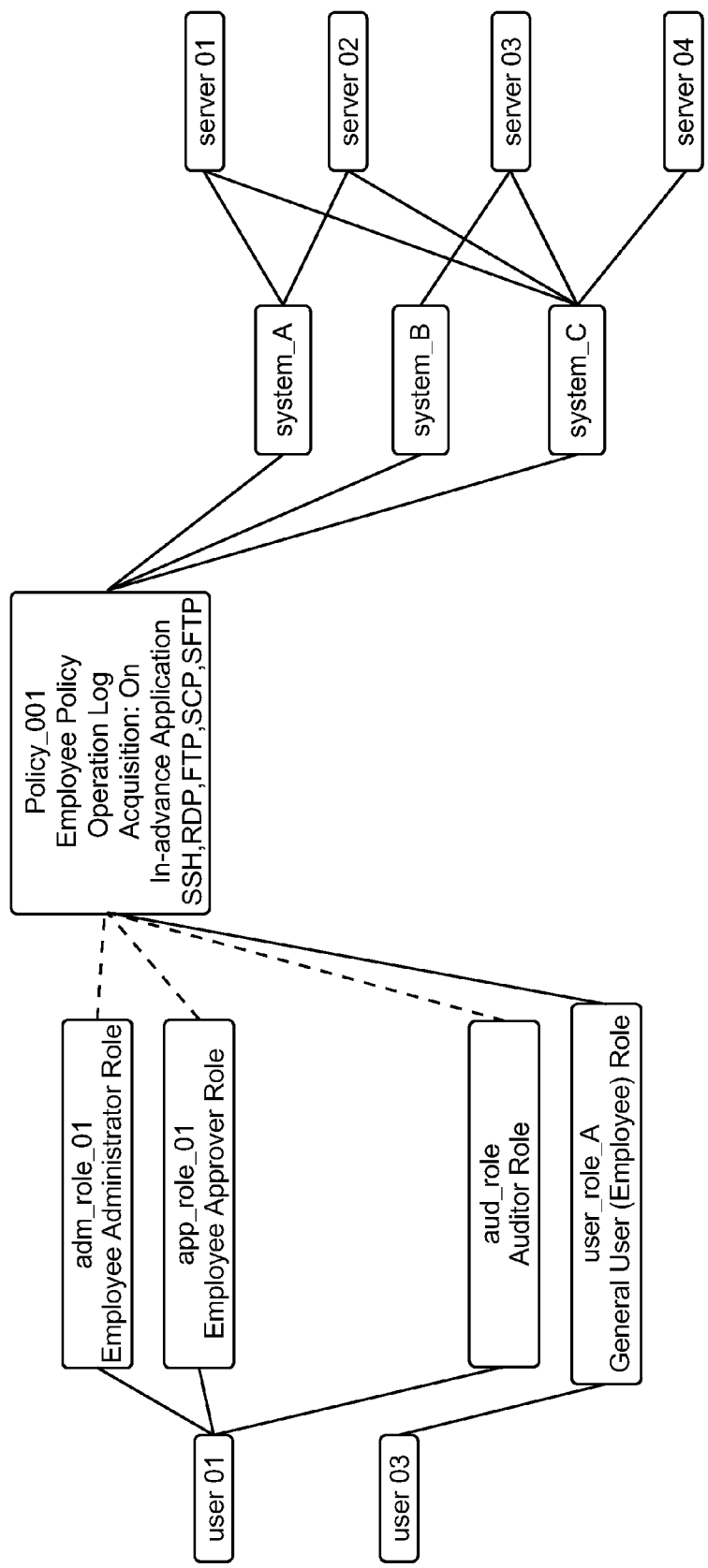
FIG. 11 is a diagram describing an access rule focusing on a role related to an employee in the access rule shown in FIG. 10.

FIG. 11 is a diagram describing the access rule focusing on a role related to an employee in the access rule shown in FIG. 10. As shown in FIG. 11, the employee administrator role, an employee authenticator role, and the auditor role are set to a user01 of the "user" object. Furthermore, the general user (employee) role is set to a user03 of the "user" object. Furthermore, the employee policy is set to all of these roles. The employee policy is set to be able to connect all of the system_A, the system_B, and the system_C. In the employee policy, the operation log acquisition is ON (operation log is acquired), the in-advance approval is required, and a SSH, a RDP, a FTP, a SCP, and a SFTP are can be used. Note that, since the respective systems are configured as follows: the system_A is configured with the server01 and the server02; the system_B is configured with a server03; and the system_C is configured with the server01, the server02, the server03, and a server04, these systems are divided into a group in units of systems.

The access rule to which these settings are performed indicates the following things. That is, the user03 of the "user" object can access all of the systems of the system_A, the system_B, and the system_C, and requires the in-advance application to perform any work. The user01 requires to execute the management, the approval, and the audit of the in-advance application from the user03. That is, the user01 is a senior of the user03 and cannot access all of the systems of the system_A, the system_B, and the system_C since the general user (employee) role is not set to the user01.

Figure 12:
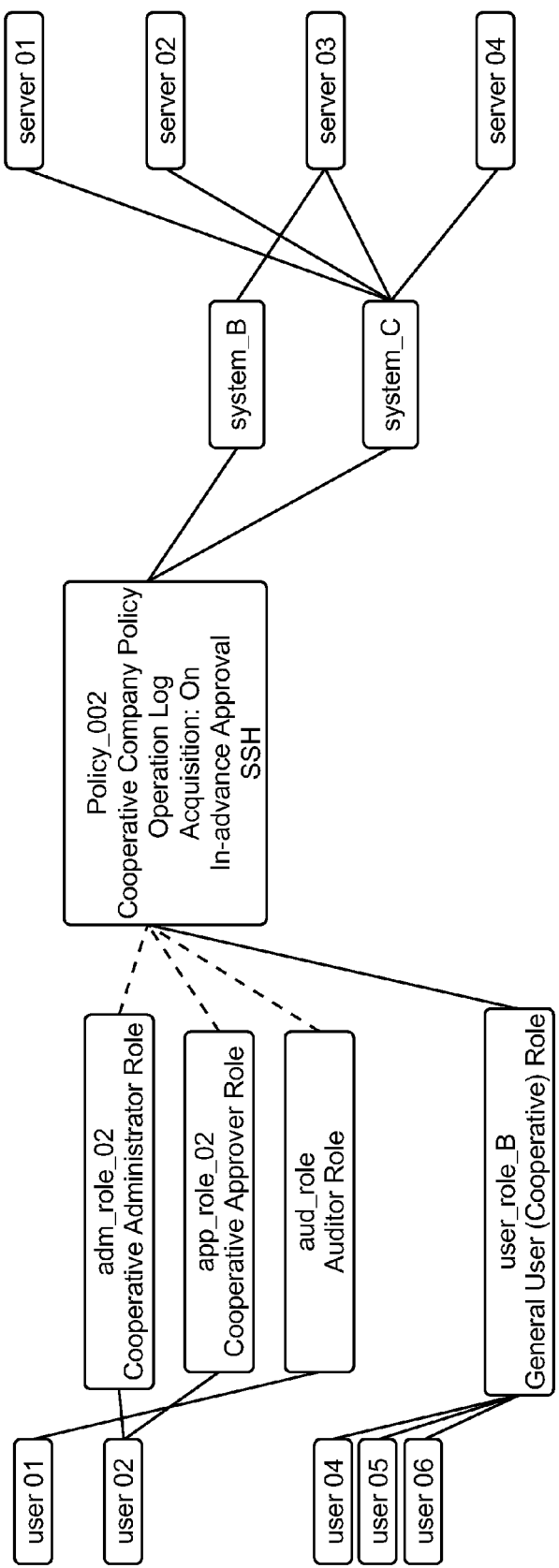
FIG. 12 is a diagram describing an access rule focusing on a role related to a cooperation company in the access rule shown in FIG. 10.

FIG. 12 is a diagram describing the access rule focusing on a role related to a cooperation company in the access rule shown in FIG. 10. As shown in FIG. 12, the auditor role is set to the user01. Furthermore, the cooperation administrator role and the cooperation approver role are set to a user02. The general user (cooperation) role is set to a user04, a user05, and a user06. Furthermore, the cooperation company policy is set to all of these roles. In the cooperation company policy, the operation log acquisition is ON (operation log is acquired), in-advance approval is required, and a SSH can be used. Furthermore, the cooperation company policy is set to be able to access the system_B and the system_C. Note that, since the system_B is configured with the server03 and the system_C is configured with the server01, the server02, and the server04, the respective systems are divided into a group in units of systems.

The access rule to which these settings are performed indicates the following things. The user04, the user05, and the user06 to which the general user (cooperation) role is set require the in-advance approval of the user02 when accessing the system_B and the system_C. That is, the user02 to which the cooperation administrator role and the cooperation approver role are set requires to execute the management and the approval related to the cooperation company policy. Furthermore, the user02 cannot perform the log audit related to the cooperation company policy, and the user01 to which the auditor role is set requires to execute the log audit.

Figure 13:
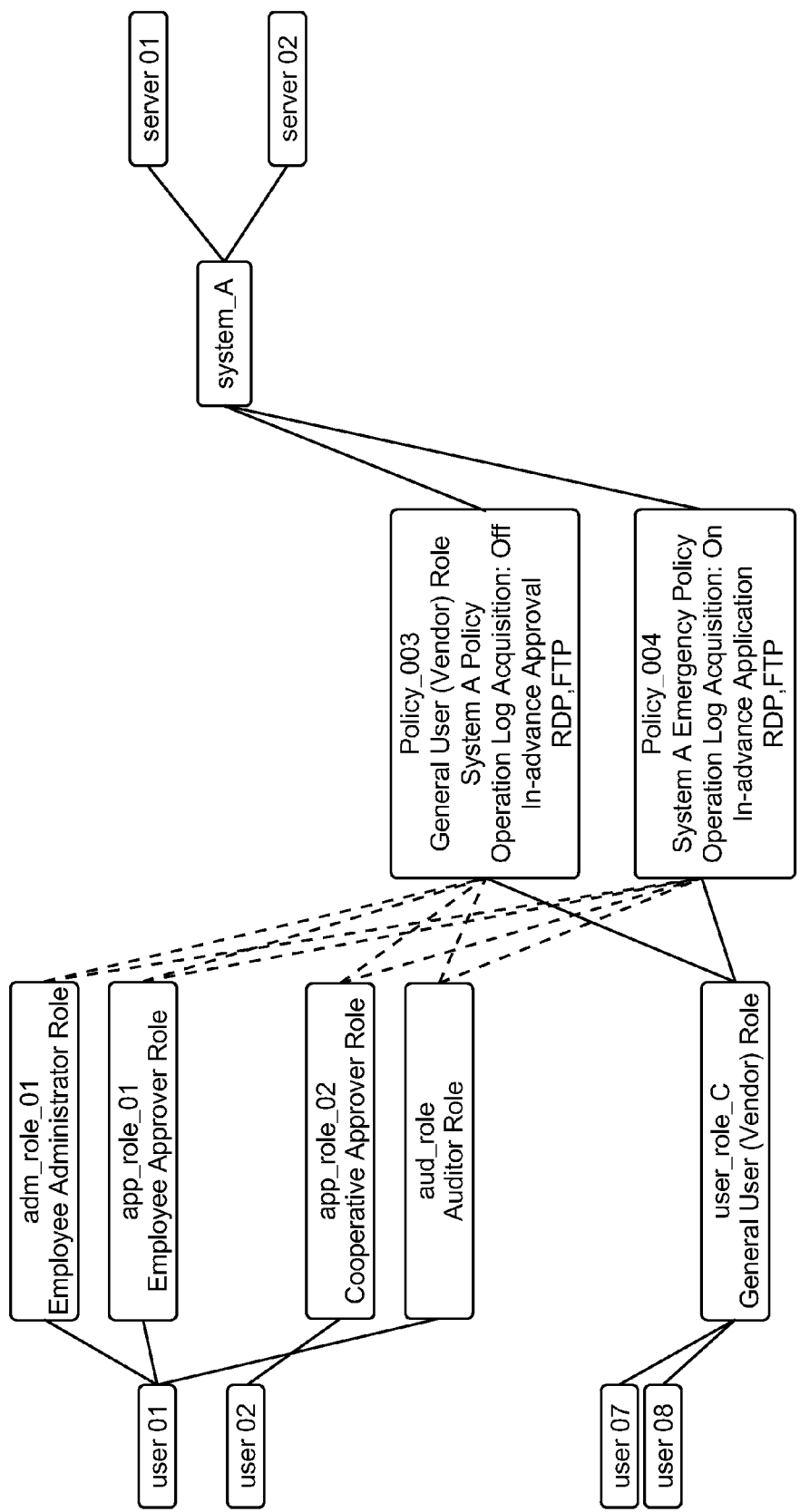
FIG. 13 is a diagram describing an access rule focusing on a role related to a vendor in the access rule shown in FIG. 10.

FIG. 13 is a diagram describing the access rule focusing on a role related to a vendor in the access rule shown in FIG. 10. As shown in FIG. 13, the employee administrator role, the employee approver role, and the auditor role are set to the user01. Furthermore, the cooperation approver role is set to the user02. The general user (vendor) role is set to a user07 and a user08. Furthermore, a system A policy and a system A emergency policy are set to all of these roles. In the system A policy, the operation log acquisition is OFF (the operation log is not acquired), the in-advance approval is required, and an RDP and a FTP can be used. Furthermore, in the system A emergency policy, the operation log acquisition is ON (the operation log is acquired), the in-advance application is required, and an RDP and a FTP can be used. Furthermore, these policies are set to be able to access the system_A. Note that, the system_A is configured with the server01 and the server02, and is set by grouping these nodes.

The access rule to which these settings are performed indicates the following things. The user07 and the user08 to which the general user (vendor) role is set can select either of the two policies when accessing the system_A. When the system A policy is selected, the in-advance approval of the user02 is required. On the other hand, when the system A emergency policy is selected, the user02 only requires to submit the in-advance application and does not require the approval. That is, it is possible to perform a normal business at an emergency if only the in-advance application is submitted. Note that, both of the user01 and the user02 can approve the application from the user07 and the user08.

Note that, the access rule shown in FIGS. 10 to 13 can be used after the system administrator accesses the access control device 14 from the approval terminal 44 and defines the rule beforehand on an access application/approval level setting screen (not shown) displayed by the access control device 14.

FIG. 14 is a diagram showing an access log search screen example. An access log search screen 90 shown in FIG. 14 is displayed on the approval terminal 44 when the approver performs access check (log audit). The approver sets search criteria for searching for the access log on the access log search screen 90 in order to confirm whether the permitted access contents are performed in accordance with the work contents of the submitted application. A search button 91 is used to execute the search for the access log with the set search criteria. When the search button 91 is clicked, data indicating the search criteria is transmitted to the log management device 15. The work verification unit 151B of the log management unit 151 of the log management device 15 extracts, based on the data indicating the search criteria, the access log registered in the log holding unit 152 and the work schedule information registered in the work schedule holding unit 139 of the access control device 14.

Figure 15B:
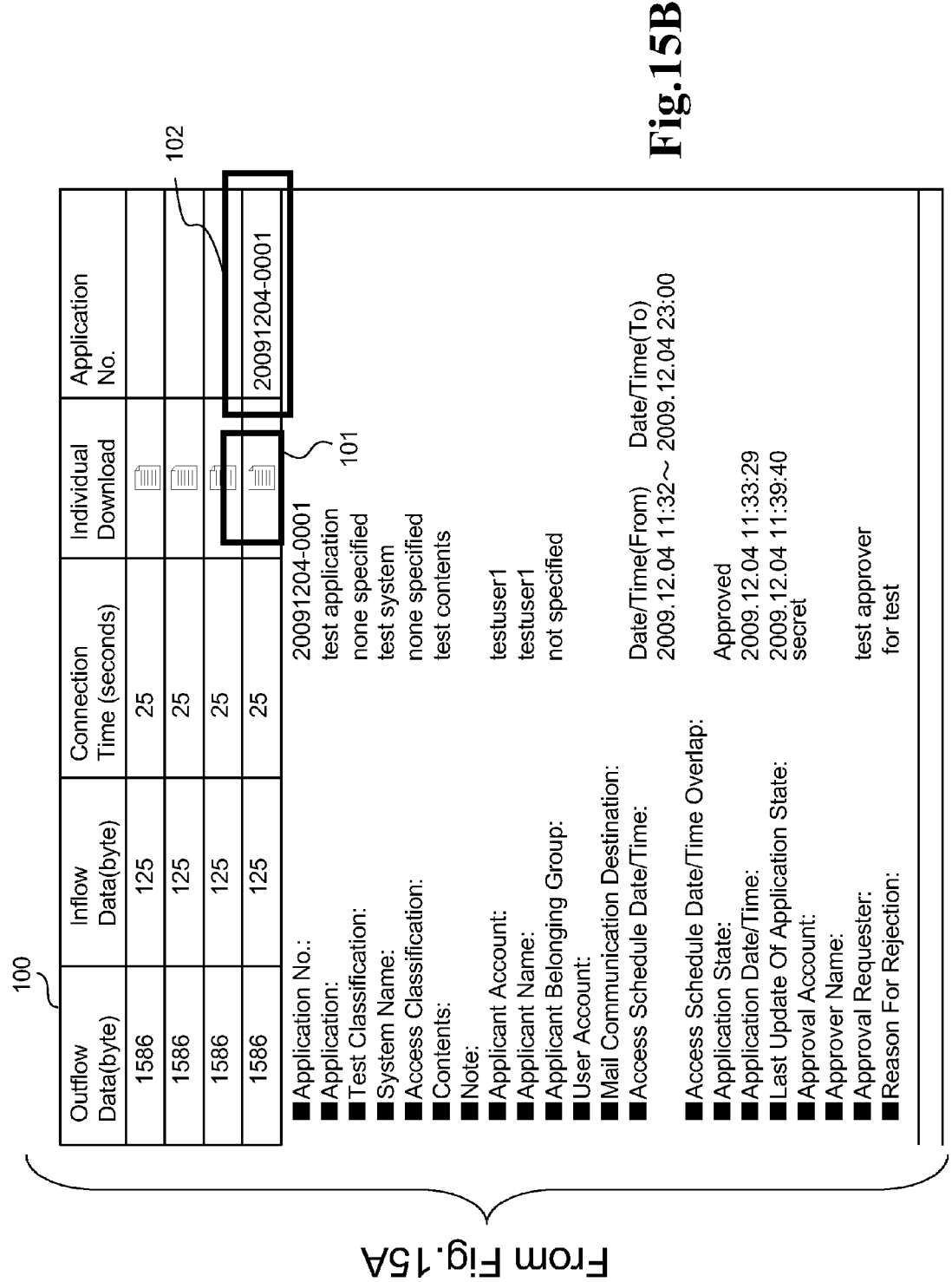
FIG. 15 is a diagram showing a search result screen example.

FIG. 15 is a diagram showing a search result screen example. A search result screen 100 shown in FIG. 15 is displayed on the approval terminal 44 when the search button 91 of the access log search screen 90 is clicked. That is, the approver searches the access control device 14 and the log management device 15 for the access log satisfying the search criteria set on the access log search screen 90, and the search result (the access log and the work schedule information) is transmitted to the approval terminal 44 and is displayed in a list on the search result screen 100 as a summary.

A file icon 101 is used to download the concrete work contents. When the file icon 101 is clicked, the contents of the concrete execution command are acquired as a text file and displayed. Furthermore, a file command 102 is used to download the application contents. When the file icon 101 is clicked, the concrete application contents are acquired and displayed. That is, the approver easily compares the access log with the application contents and can efficiently perform the log audit.

Note that, if a prohibited command which is regarded as unnecessary according to the application contents is registered as a key word beforehand, it is possible to extract a record line number and a record including the key word. For example, when the access application for "general ID work" as access classification is submitted, it is obvious that the access with the general ID does not need a command to acquire a privileged ID nor normally issue a command to add a user. Therefore, "SU-" (a command to acquire a privileged ID) and "useradd" (a command to add a user) which are prohibited or unnecessary for the "general ID work" are registered as key words beforehand. Thus, an access log including the prohibited command regarded as unnecessary according to the application contents can be extracted and supplied to the approver and it is possible to efficiently find unauthorized use.

Furthermore, by using a function of an email notification, when the operation matching the key words is performed, it is possible to notify the administrator of an email. Thus, it is possible to efficiently perform a log audit only to perform an access check.

Note that, the search result has been displayed to compare the access log with the application contents. However, the work verification unit 151B of the log management unit 151 can compare, based on the data indicating the search criteria, the work schedule information registered in the work schedule holding unit 139 of the access control device 14 with the access log registered in the log holding unit 152, and detect, as unauthorized access, the access which does not match the access to perform the maintenance work in the submitted application in the work schedule information among the access shown in the log information.

[Regarding Work Application Processing]

Here, work application processing which the worker of the operation terminal 20 performs will be described below. First, the worker inputs the user ID and the password on the login screen 50, shown in FIG. 5, displayed on the operation terminal 20. The operation terminal 20 directly accesses the access control device 14 with the input user identification information without accessing the relay device 11. The access control device 14 transfers the user identification information to the user authentication device 12. The user authentication unit 121 of the user authentication device 12 performs the user authentication with reference to the authorized user information in the authorized user information holding unit 122. When the authentication has failed, the subsequent processing is not executed.

When the authentication has succeeded, the user authentication device 12 notifies the access control device 14 of the success of the authentication. The application state management unit 131 of the access control device 14 transmits the data for the application screen to the operation terminal 20. The operation terminal 20 displays the access application screen 60 shown in FIG. 6. The user inputs data to the access application screen 60 and the input data is transmitted as the work application information to the access control device 14.

The application state management unit 131 of the access control device 14 compares the work contents of the submitted application with the execution condition information in the execution condition holding unit 137 and determines whether or not the application can be registered. When the application is not the valid work application, the application state management unit 131 rejects the application and notifies the operation terminal 20 of the rejection, and the subsequent processing is not executed. On the other hand, when the application is determined as the valid work application, the application state management unit 131 registers the submitted application for the maintenance work in the work schedule information in the work schedule holding unit 139. If the work requires the approval, the application state management unit 131 transmits an email for the approval to the approval terminal 44.

With the above described processing, in the work application information, only the work application information satisfying the requirement for the valid work application is formally registered as the "work schedule information" in the work schedule holding unit 139.

[Regarding Work Approval Processing]

Next, approval processing of the work contents of the application submitted by the work application processing will be described below. The approval terminal 44 receives the email notifying that the application has been submitted, and then, accesses the access control device 14. The approver inputs a user ID and a password to the login screen 50 shown in FIG. 5 at arbitrary timing. Furthermore, the approver designates the application number at inputting the user ID and the password. The approval terminal 44 transmits the input user ID and password of the approver to the user authentication device 12. The user authentication unit 121 of the user authentication device 12 acquires the user ID and the password from the approval terminal 44 and performs the user authentication of the approver with reference to the authorized user information registered in the authorized user information holding unit 122. When the user authentication has failed, the subsequent processing is not executed.

When the authentication has succeeded, the application state management unit 131 of the access control device 14 searches the work application information registered in the work schedule holding unit 139 based on the application number acquired from the approval terminal 44. The application state management unit 131 of the access control device 14 transmits hypertext markup language (HTML) data for the access approval screen 80 to the approval terminal 44 based on the searched work application information. The approval terminal 44 displays the access approval screen 80 (FIG. 8) related to the work designated by the application number. The approver confirms the access approval screen 80 and clicks the approval button 85 or the rejection button 86 and the input data is transmitted to the access control device 14. The application state management unit 131 of the access control device 14 updates the work schedule information in the work schedule holding unit 139 according to whether or not the application is approved. The application state management unit 131 notifies the operation terminal 20 of whether or not the application is approved.

With the above described processing, the work of the validly submitted application is approved. Note that, approval of an application may be performed with a user interface such that when the approver accesses the access control device 14, the access control device 14 displays the listed work application waiting for approval, and the approver selects the approval target work application from the list. Furthermore, a plurality of work application may be collectively approved or rejected.

[Regarding Remote Login Processing]

Next, remote login processing to the business information system will be described below. First, the worker accesses the relay device 11 from the operation terminal 20. The relay device 11 confirms the IP address of the accessing operation terminal 20 and determines whether or not the connection is permitted. When the connection has not been permitted, the relay device 11 disconnects the connection. On the other hand, when the connection from the operation terminal 20 has been permitted, the relay device 11 requests the user identification information (the user ID and the password) in a form suitable for the protocol from the operation terminal 20. The operation terminal 20 displays the login screen 50 (FIG. 5) and accepts the input of the user ID and the password from the worker. The operation terminal 20 transmits the input user ID and password to the relay device 11.

The relay device 11 supplies the user ID and the password received from the operation terminal 20 to the user authentication device 12 and the access control device 14. The user authentication unit 121 of the user authentication device 12 acquires the user ID and the password from the relay device 11 and performs the user authentication of the worker with reference to the authorized user information registered in the authorized user information holding unit 122. When the user authentication has failed, the subsequent processing is not executed.

When the authentication has succeeded, the relay device 11 request to input the access destination from the operation terminal 20. The operation terminal 20 accepts the input of the access destination from the worker and transmits the information indicating the access destination (such as an IP address and a host name) to the relay device 11. The relay device 11 supplies the information indicating the access destination received from the operation terminal 20 to the access control device 14. The access right authentication unit 136 of the access control device 14 confirms, based on the information indicating the access destination, the access right of the user to the access destination with reference to the access application state registered in the access right information holding unit 141. When determining that the access is inappropriate, the access right authentication unit 136 rejects the access of the user to the access destination. On the other hand, when determining that the access is appropriate, the access right authentication unit 136 permits the access of the user to the access destination. Then, all of the determination is positive, the worker enables to access the business information system as the maintenance work target.

With the above described processing, when the remote login to the business information system is determined as the unauthorized access, the login has failed and it is possible to prohibit the access.

[Regarding Access Check Processing]

Figure 16:
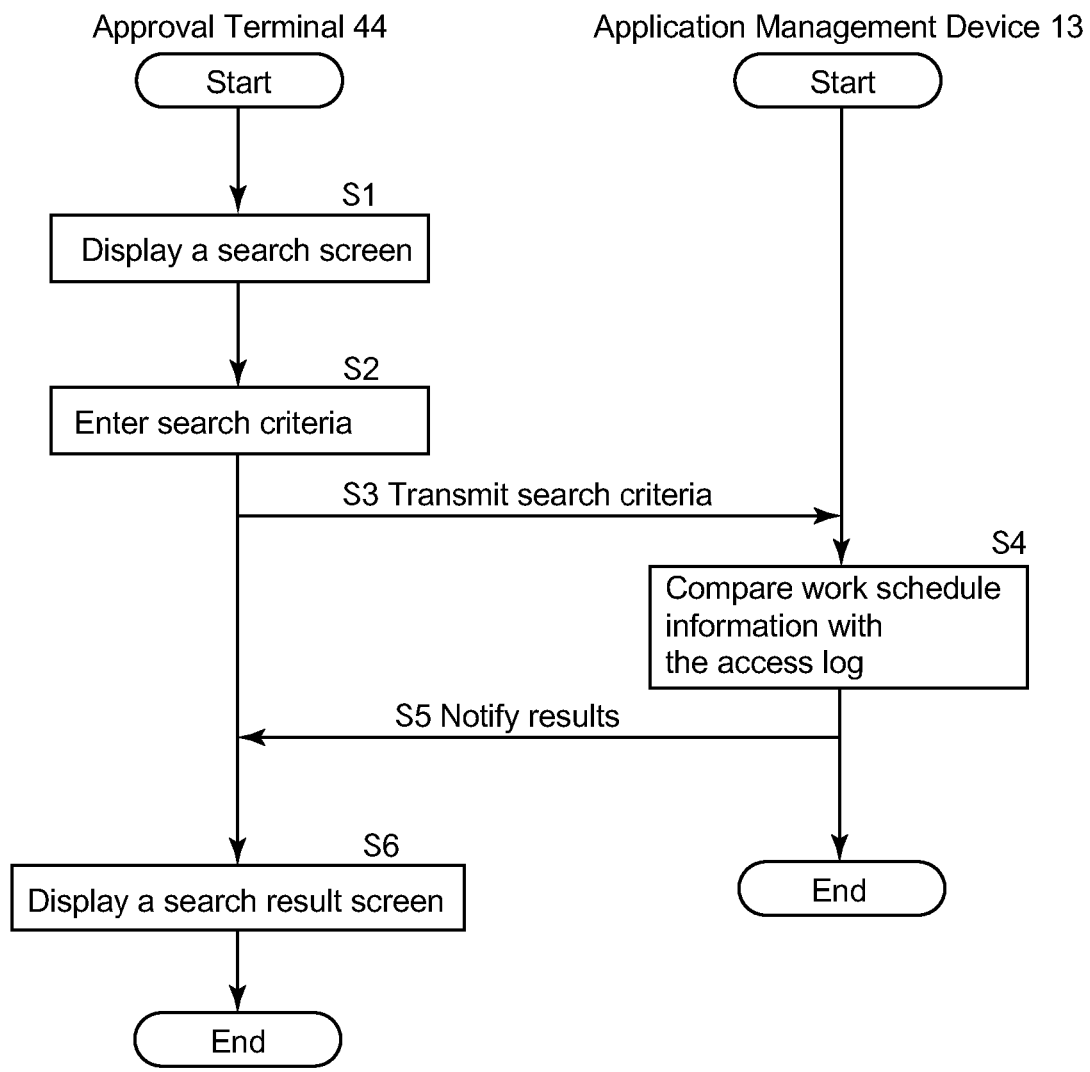
FIG. 16 is a flowchart describing access check processing.

Next, with reference to the flowchart of FIG. 16, access check processing will be described below. The approver instructs to execute the access check (log audit) with an input unit (not shown) of the approval terminal 44 in order to confirm whether or not the permitted access contents are performed in accordance with the work contents of the submitted application.

In step S1, the approval terminal 44 displays the access log search screen 90 shown in FIG. 14 based on the instruction from the approver. The approver sets search criteria for searching for the access log on the access log search screen 90. In step S2, the approval terminal 44 accepts the input of the search criteria for the access log set by the approver. Then, when the search button 91 is clicked, in step S3, the approval terminal 44 transmits the accepted input data of the search criteria for the access log to the log management device 15.

In step S4, when receiving the data of the search criteria from the approval terminal 44, the work verification unit 151B of the log management device 15 reads the work schedule information corresponding to the application number included in the data of the search criteria from the work schedule holding unit 139 of the access control device 14. Furthermore, the work verification unit 151B reads the access log associated with the application number from the log holding unit 152 and checks whether or not unauthorized access is performed by comparing the work schedule information with the access log. For example, as described above, although the work application for the "operation monitoring" has been submitted, when file rewriting processing is performed, it is determined as unauthorized access. In step S5, the work verification unit 151B reads the access log matching the search criteria from the log holding unit 152 and notifies the approval terminal 44 of the access check result.

In step S6, the approval terminal 44 displays the search result screen 100 shown in FIG. 15 based on the access check result received from the log management device 15. Note that, when a prohibited command which is regarded as unnecessary according to the application contents is registered as a key word and the access log matching the key word is searched, it is possible to notify the administrator of the record line number and the record matching the searched key word by an email.

[Effects in Embodiments of Invention]

As described above, the access control device 14 which controls access of the operation terminal 20 (a client terminal) to the server constituting the business information system (a predetermined system) includes the access rule specifying screen generation unit 133 (a screen generation unit) configured to generate selection screen information to select, from one or more access rules created by an administrator of the business information system, an access rule used by a user who logins to the operation terminal 20 and the access control unit 135 configured to execute access control of the user in accordance with an access rule selected from access rules displayed based on the selection screen information.

Thus, the system administrator can present one or more access rules to the user and enable the user to select the access rule to be used. Therefore, the system administrator only requires to create and set a necessary access rule to a user and does not require to change the setting of the access rule one by one according to work contents. Thus, it is easy to manage access control. Furthermore, for a user, one or more selectable access rules are presented and the user can select an access rule according to one's own work contents from the presented access rules, if there are plural access rules. Thus, it is possible to select the access rule while concretely grasping what kind of access rule is applied to oneself. Furthermore, a person who audits access control only requires to confirm the access control paying attention to the selected access rule, since the access control is performed in accordance with the access rule selected by the user. Therefore, when a plurality of access rules are combined and set to each user, it is easy to grasp whether the access is actually performed in accordance with the assumed control. Thus, it is possible to reduce a load of the person who performs an audit.

Furthermore, in addition to the above described configuration, the access rule holding unit 140 (a first storage unit and a second storage unit) is configured to store one or more access rules created by an administrator of the business information system and to store, as an access rule which is applied at executing access control of the user, an access rule selected by the user from one or more access rules displayed based on selection screen information generated by the access rule specifying screen generation unit 133.

Thus, since the access rule applied to the user is also recorded, it is possible to easily confirm how the access control has been performed from the record. Therefore, a client company has an advantage that the compliance of own system is easily proved. With the above described features, the access control device 14 included in the business information protection device 10 can contribute to "strengthening of internal control" required by the SOX act.

Furthermore, in addition to the above described configuration, when an inquiry request about an access rule available to the user is performed, the access rule specifying screen generation unit 133 is configured to specify an access rule available to the user with reference to the access rule holding unit 140 and to generate specifying screen information indicating a name of an access rule associated with a user who has performed an inquiry request or a predetermined user group to which the user belongs among the identified access rules.

Thus, the available access rules can be listed and presented to the user, and it is possible to reduce a load when the access rule is selected.

Furthermore, in addition to the above described configuration, the access control unit 135 (a rule search assist unit) to search for an access rule stored in the access rule holding unit 140 is included, and when a search for the access rule is requested by the user, the access control unit 135 is configured to generate screen information to search for the access rule by designating a name of the access rule or a name of a connection destination node.

Thus, when the user submits an access application, it is possible to easily search for the access rule by using a maintenance work target server name as a key.

Furthermore, in addition to the above described configuration, the access control unit 135 to search for an access rule stored in the access rule holding unit 140 is provided, and the access control unit 135 is configured to generate screen information indicating an access rule which has been used by the user or a predetermined user group to which the user belongs.

Thus, the access rule which has been used by the same user or the user group to which the user belongs is presented as the selectable access rule. Therefore, if many selectable access rules are existed, it is possible to reduce a load when the user selects an access rule.

Furthermore, the above described access control method described as the access rule of the access control device 14 and program for causing a computer to function as the access control device 14 have similar effects to the access control device 14.

In the above description, the "maintenance work" has been described as an example. However, the present invention is not limited to this and can be applicable, for example, to the case in which an employee performs access from outside a company.

The above described series of processing may be executed by hardware or software. When the series of processing is executed by software, a program constituting the software is installed, from a program recording medium, to a computer embedded in dedicated hardware or a general-purpose personal computer which can execute various functions by installing various programs.

The present invention is not limited to the above embodiments, and various inventions may be formed by transforming and embodying constituent elements, and appropriately combining a plurality of constituent elements disclosed in the above embodiments without departing from the scope in a practical phase. For example, some constituent elements may be omitted from all of the constituent elements described in the embodiments. Furthermore, constituent elements in different embodiments may be appropriately combined.

REFERENCE SIGNS LIST 14 access control device,
20 operation terminal (client terminal),
41 financial information system (an example of predetermined system),
42 customer information system (an example of predetermined system),
43 inventory management system (an example of predetermined system),
133 access rule specifying screen generation unit (an example of screen generation unit),
135 access control unit (an example of access control unit and rule search assist unit),
140 access rule holding unit (an example of first storage unit and second storage unit)

The invention claimed is:

1. An access control device for controlling access of a client terminal to a server constituting a predetermined system, comprising a CPU and a memory,
wherein:
the memory comprises:
a first storage unit storing one or more access rules created by an administrator of the predetermined system for each user; and
a second storage unit storing an actual access rule which is actually applied at executing access control of a user logged in to the client terminal, and wherein:

the CPU operates as:

a screen generation unit generating selection screen information to make the client terminal display the selection screen for the user logged in to the client terminal to select, from the one or more selective access rules stored in the first storage unit for the user, an access rule to be used by the user logged in to the client terminal; and an access control unit making the second storage unit store the access rule selected at the client terminal as the actual access rule and executing access control of the user in accordance with the actual access rule stored in the second storage unit.

2. The access control device according to claim 1, wherein:

the screen generation unit refers the second storage unit, in response to an inquiry request from the client terminal about an access rule allowed for a user, to specify the access rule allowed for the user, and generates specifying screen information indicating a name for specifying an access rule associated with the user who has requested the inquiry or a predetermined user group to which the user belongs.

3. The access control device according to claim 1, further comprising:

a rule search assist unit configured to search for an access rule stored in the first storage unit, wherein, the rule search assist unit is configured to generate screen information, in response to a request from a user for searching for an access rule, on which the access rule is able to be searched for by specifying a name of the access rule or a name of a connection destination node.

4. The access control device according to claim 1, further comprising:

a rule search assist unit configured to search for an access rule stored in the first storage unit is provided, wherein, the rule search assist unit is configured to generate screen information indicating an access rule which has been used by the user or a predetermined user group to which the user belongs.

5. An access control method for controlling access from a client terminal to a server constituting a predetermined system, including:

a storing step for storing one or more access rules created by an administrator of the predetermined system for each user and an access rule which is actually applied at executing access control of the user;

a screen generation step for generating selection screen information to select, from the one or more access rules created by the administrator of the predetermined system, the access rule used by the user who logins to the client terminal; and an access control step for executing access control of the user in accordance with an access rule selected from access rules displayed based on the selection screen information.

6. A non-transitory computer-readable storage medium storing a computer program causing a computer to function as an access control device which controls access from a client terminal to a server constituting a predetermined system, the program to causing the computer to function as:

a first storage unit storing one or more access rules created by an administrator;

a second storage unit storing an actual access rule which is actually applied at executing access control of a user;

screen generation means for generating selection screen information to select, from the one or more access rules created by the administrator of the predetermined system, the access rule used by the user who logins to the client terminal; and access control means for executing access control of the user in accordance with an access rule selected from access rules displayed based on the selection screen information.

* * * * *